Oct. 21, 1969 W. BRUCH 3,474,190

PHASE DISTORTION COMPENSATING CIRCUIT FOR PAL COLOR TELEVISION RECORDING SYSTEM

Filed July 20, 1966

INVENTOR
Walter Bruch

BY Spencer & Kaye

ATTORNEYS 3,474,190

PHASE DISTORTION COMPENSATING CIRCUIT FOR PAL COLOR TELEVISION RECORDING SYSTEM

Walter Bruch, Hannover, Germany, assignor to Telefunken Patentverwertungsgesellschaft m.b.H., Ulm, Danube, Germany Filed July 20, 1966, Ser. No. 566,642
Claims priority, application Germany, July 22, 1965, T 29,038
Int. Cl. H04n *5/38, 5/44*
U.S. Cl. 178—5.4 7 Claims

ABSTRACT OF THE DISCLOSURE

A circuit particularly for use in the playback of recorded color TV signals for compensating for phase distortions induced in a recorded color information carrier signal due to variations in the velocity of the recording medium. The circuit is particularly for use with PAL color TV signals and includes a color synchronizing signal the relative phase of which is varied by a predetermined amount between each successive pair of picture scanning lines defined by the carrier signal. The circuit includes electronically controllable time delay means having a control input which determines the amount of time delay to be imparted to the color carrier signal. Means is also provided for producing a constant phase reference carrier signal of the same frequency as the color synchronizing signal. A phase comparator means is used having a first input connected to receive the reference signal and the second input connected to receive the synchronizing signal. The output is connected to the control input of the delay line. The phase shifting means is provided and connected in series with one of the comparator inputs to shift the phase of the signal applied thereto at a rate equal to the picture scanning rate defined by the color carrier signal and by an amount equal to the predetermined amount by which the synchronizing signal is varied.

The present invention relates to a circuit arrangement, and particularly to a circuit arrangement for use in the play-back of recorded color TV signals.

The invention is particularly concerned with a novel arrangement for compensating phase distortions which might be induced in a recorded color information carrier signal as the result of variations in the transport velocity of the medium on which the signal is recorded, this medium generally being constituted by a magnetic tape.

It is known that when a recorded phase-modulated color information carrier signal is played back, the signal is often subjected to phase distortions as a result of variations in the velocity with which the recording tape is fed past its associated reading head. Since the phase of the color carrier signal constitutes one parameter determining the colors reproduced, such phase distortions will generally produce a corresponding distortion in the picture colors.

For compensating the distortions caused by the variations in the tape velocity, it is already known to compare the scanning line synchronizing signal taken from the tape with a reference scanning line synchronizing signal taken from a clock and to employ the result of such comparison to correct the tape velocity.

It has also been suggested, in British Patent No. 939,055, to compare the color synchronizing signal derived from the tape, which signal is transmitted at the beginning of each scanning line and consists of several unmodulated cycles of the color carrier signal, with a locally produced reference carrier signal having a constant phase angle, and to employ the result of this comparison to apply a variable time delay to the color carrier signal by means of an electronically controllable time delay line through which the color carrier signal is fed. The time delay line is thus controlled in such a manner that it imparts a time delay to the color carrier signal which is sufficient to compensate for phase variations in the color carrier signal emanating from the tape recorder.

A circuit arrangement of a similar type might also be employed in conjunction with a recorded PAL-color TV signal because such a signal also includes, at the beginning of each scanning line, a constant phase color synchronizing signal.

In one known type of PAL-color TV system, the phase of the color synchronizing signal is shifted from one scanning line to the next in order to synchronize a video switch incorporated in the television receiver and having a switching frequency equal to the picture line scanning frequency. During the play-back of a recorded TV signal having a color synchronizing signal of this type, the above-described known distortion compensating system can not be employed because, due to the intentional phase shifting of the color synchronizing signal from one scanning line to the next, a fixed relationship does not exist between the phase angle of the color synchronizing signal and the phase angle of the reference carrier signal. Thus, if such a compensation were used, the time delay control signal resulting from a phase comparison between the synchronizing signal and the reference carrier signal would vary from one scanning line to the next and would thus have the effect of incorrectly phase shifting the color carrier signal. The result would be a distortion of the color information carried by this latter signal.

It is a primary object of the present invention to overcome this drawback.

A more specific object of the present invention is to correct for the intentional phase shifting of the color synchronizing signal in a recorded PAL-color TV signal so as to permit phase variations induced in this signal during play-back to be correctly compensated.

These and other objects according to the present invention are achieved by the provision of a novel circuit for compensating for phase distortions appearing in a color information carrier signal reproduced by a recording device and including a color synchronizing signal whose relative phase is varied by a predetermined amount between each successive pair of picture scanning lines defined by the carrier signal. The circuit according to the present invention includes electronically controllable time delay means connected to conduct the color carrier signal and having a control input for receiving a signal whose value determines the amount of time delay imparted to such color carrier signal, and means producing a constant phase reference carrier signal having the same frequency as the color synchronizing signal. The circuit further includes phase comparator means having a first input connected to receive the reference signal, a second input connected to receive the synchronizing signal and an output connected to the delay line control input. Finally, in accordance with a principal novel feature of the present invention, the circuit is further provided with phase shifting means connected in series with one of the comparator inputs for shifting the phase of the signal applied thereto at a rate equal to the picture line scanning rate defined by the color carrier signal and by an amount equal to the predetermined amount by which the synchronizing signal is varied.

According to an additional novel feature of the present invention, the phase shifting means includes control means connected to receive pulses derived from the color synchronizing signal for synchronizing the phase shifting rate to the picture scanning rate.

The circuit according to the present invention may be arranged, for example, so that the feeding of either the reference carrier signal or the color synchronizing signal to its respective phase comparator input is carried out by alternately providing a direct connection or a connection through a phase shifting element which imparts a phase shift equal to that by which the synchronizing signal is varied, the alternation between a direct connection and a connection through the phase shifter being carried out at the picture scanning rate, or line frequency, of the color carrier signal.

The present invention may also be carried out by feeding the signal to be phase shifted in an alternating manner successively through two separate phase shifters producing phase shifts which differ from one another by the predetermined amount mentioned above. The two phase shifters could be arranged so that one produced a positive phase shift, while the other produces a negative phase shift.

If this phase shifting is carried out on the reference carrier signal, the effect is to artificially introduce a phase shift into the reference carrier signal which is equal to that already present in the color synchronizing signal. On the other hand, if the phase shift is carried out on the color synchronizing signal, the effect is to artificially eliminate the relative phase shift previously existing between the color synchronizing signals associated with each successive pair of picture lines.

Regardless of which signal is subjected to an alternating phase shift, the result is that the signals applied to the phase comparator means will always have the same phase angle with regard to their respective reference phase angles. As a result, the phase difference between the compared signals, and hence the output from the phase comparator, will be a function only of the phase difference existing between the two signals as a result of variations in the transport velocity of the recording medium on which the color carrier signal is stored.

Additional objects and advantages of the present intion will become apparent upon consideration of the following description when taken in conjunction with the accompanying drawings in which.

Figure 1:
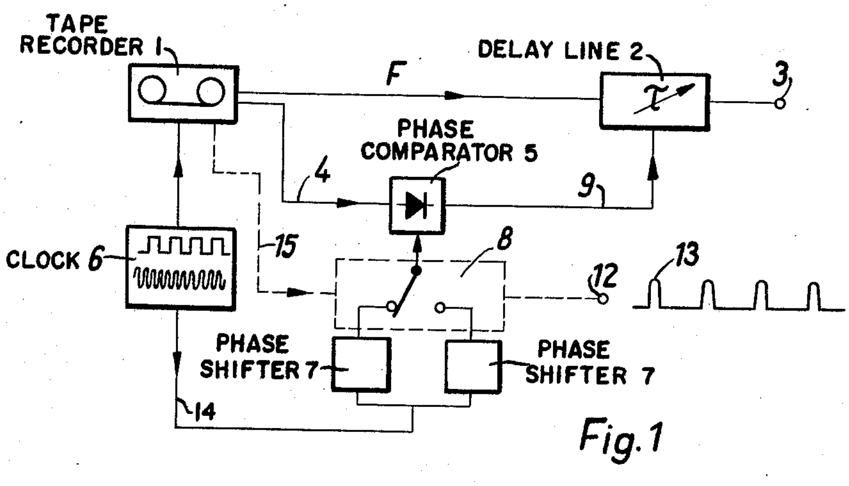
FIGURE 1 is a block diagram of a preferred embodiment of the present invention.

Referring first specifically to FIGURE 1, there is shown a video tape recorder 1 of a type which is well-known per se, which is controlled by a main clock 6 and which supplies a recorded color information carrier signal F to an output terminal 3 through a delay line 2 whose time delay is electronically controllable. Tape recorder 1 also supplies color synchronizing signals which are recorded with the carrier signal and which are delivered to a phase comparator circuit 5 via a line 4.

The main clock 6 also delivers to a line 14 a reference carrier signal having a constant phase and a frequency equal to that of the color synchronizing signals. This reference carrier signal is fed directly to the two inputs of an electronically controlled video switch 8 through independently adjustable phase shifting circuits 7. The output from video switch 8 is connected to the second input of phase comparator circuit 5. According to one specific embodiment of the present invention, one of the phase shifters 7 may be adjusted to apply a phase shift of 90° and the other phase shifter 7 may be deleted or adjusted to apply a phase shift of 0°.

The output from phase comparator circuit 5 is supplied via a line 9 to the control input of delay line 2 for varying the time delay produced by this line. The output from phase comparator 5 thus controls the time delay applied to color information carrier signal F in such a manner as to compensate the phase distortions experienced by carrier signal F due to variations in the speed with which the tape is transported through the tape recorder 1. It thus results that the output appearing at terminal 3 is constituted by a phase corrected color information carrier signal.

The main clock 6 acts to deliver synchronizing pulses to the video tape recorder 1, for example, to permit several video tape recorders to be operated in synchronism so that their individual signals can be combined. Clock 6 also acts to deliver the reference carrier signal employed for correcting the phase of the color carrier signal supplied by the tape recorder.

Video switch 8 is provided with a switching control terminal 12 to which signals are applied for controlling the switching frequency of the switch. This control is effectuated by supplying a train of pulses 13 having a repetition rate equal to the line scanning frequency of the TV picture to be produced. The phase synchronization of the switching of switch 8 can be controlled by supplying a signal derived from the color synchronizing signal thereto from tape recorder 1 via line 15.

Figure 2:
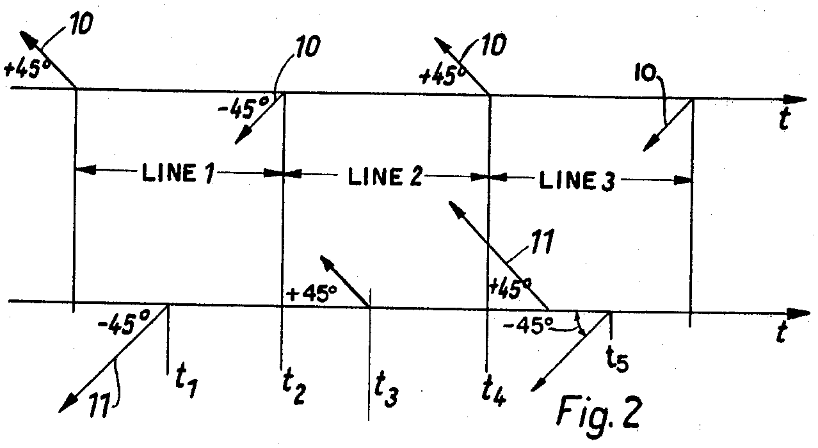
FIGURE 2 is a vector diagram used in explaining the operation of the arrangement of FIGURE 1.

Referring now to FIGURE 2, the upper line thereof shows a series of vectors representing the phase position of the color synchronizing signal 10 appearing on line 4 of FIGURE 1 at the beginning of each scanning line of the TV picture to be reproduced. As may be seen, the phase of the synchronizing signal is shifted, from one scanning line to the next, alternately between +45° and −45° with respect to a horizontal reference axis. The lower line of FIGURE 2 similarly shows a series of vectors representing the phase angle, with respect to some reference phase angle, of the modified reference carrier signal 11 appearing at the output of video switch 8.

The first vector appearing in the lower line of FIGURE 2 is initially assumed to have a phase angle of −45° with respect to the reference phase angle for signal 11 during the scanning of a first picture line. Then, at the ibnstant $t_2$, corresponding to the beginning of a second picture line, a phase comparison takes place in phase comparator circuit 5 between signals 10 and 11. Since at this instant each of the signals being compared has a angle of −45° relative to its respective reference phase angle, the output from phase comparator 5 will have a value proportional to the actual phase angle between the reference carrier signal 11 and the color synchronizing signal 10, and therefore also proportional to the deviation of the actual tape transport speed in recorder 1 from its desired value. This comparator output signal is applied via line 9 to time delay line 2 in order to cause the appropriate phase compensation to be applied to color carrier signal F.

If the reference carrier signal 11 were to continue to have a phase angle of −45° with respect to its reference phase angle, then at the time $t_4$, for example, which corresponds to the beginning of the third scanning line of the TV picture, the color synchronizing signal 10 and the reference carrier signal 11 would have different phases relative to their respective reference phase angles. As a result, phase comparison circuit 5 would produce an incorrect output signal which would cause an incorrect phase compensation to be applied by the delay line 2 to the color carrier signal F.

This undesirable phase angle variation is prevented, according to the present invention, by switching the output of switch 8 from one of its inputs to the other by the application of a pulse 13 at the terminal 12 at some instant $t_3$, which lies between the instants $t_2$ and $t_4$, for shifting the phase angle of the reference carirer signal apearing at the output of switch 8 by 90°. The effect of this phase shift is shown in the lower wave form diagram of FIGURE 3, which is drawn to an enlarged time scale. This phase shift assures that the reference carrier signal 11 and the color synchronizing signal 10 will once again both have the same phase with respect to their reference phase angles at the time $t_4$ of the next phase comparison.

Figure 3:
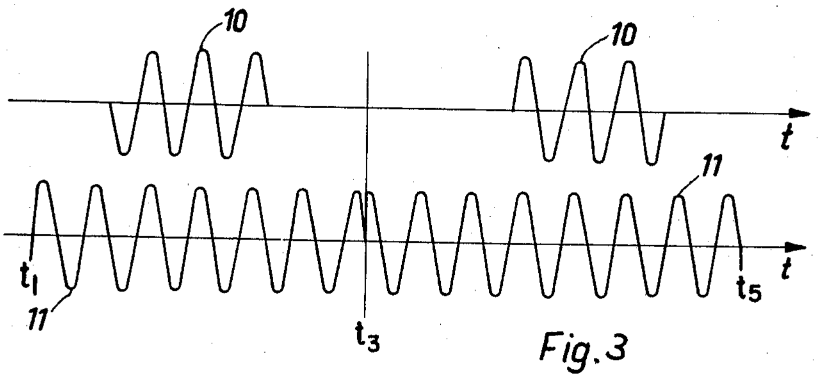
FIGURE 3 is a waveform diagram also used in explaining the operation of the embodiment of FIGURE 1.

FIGURE 3 shows, at the upper line thereof, the wave form of two successive bursts of the color synchronizing signal 10 and, at the lower line thereof, the wave form of the reference carrier signal 11 with which the signal 10 is compared.

As has been mentioned above, the switching of video switch 8, which is constituted by an electronic switch, is controlled by line scanning-frequency pulses 13 applied to control terminal 12. It is also possible to assure the proper synchronization of the operation of switch 8 by applying thereto, via line 15, a synchronizing signal derived directly from the color synchronizing signal 10, whose phase angle varies from one scanning line to the next. The signal to be applied to switch 8 may be derived from the color synchronizing signal 10 by demodulating the latter signal in a synchronous detector, or demodulator, or by effectuating a time delay demodulation by adding or subtracting the color synchronizing signals associated with two successive scanning lines.

The video switch 8 could also be controlled by signals derived from clock 6 by providing the clock with means which synchronize the tape playing speed not only with the line scanning frequency, but also with the switching sequence for a plurality of tape recorders in such a manner that, for example, scanning lines whose color synchronizing signals have a +45° position with respect to their associated reference phase angle are in time coincidence from one tape recorder to another. This can be accomplished, for example, by providing control pulses which are derived from the phase shift of the color synchronizing signals.

Apparatus for producing the results contemplated by the present invention can also be constructed with the switching arrangement composed of phase shifters 7 and switch 8 disposed in the line 4 carrying the color synchronizing signal 10. It is also possible to adjust phase shifters 7 so that one phase shifter produces a phase shift of +150° and the other produces a phase shift of +60°, for example. It is equally possible to provide two phase shifters producing phase shifts of +45° and −45°, respectively. In each case, it is only necessary that a relative phase shift of 90° occur between the signals applied to the two inputs of the video switch 8. Any one of the above-mentioned phase shifting arrangements can be positioned either in the path of the reference carrier signal or in the path of the color synchronizing signal.

It may thus be seen that the present invention provides a highly effective and relatively simple means for automatically and continuously compensataing undesirable phase shifts produced in a recorded PAL-color carrier signal as a result of velocity variations in the rate of advance of the medium, such as a magnetic tape, on which the signal is recorded.

It will be understood that the above description of the present invention is susceptible to various modifications, changes and adaptations, and the same are intended to be comprehended within the meaning and range of equivalents of the appended claims.

What is claimed is:

1. A circuit for compensating for phase distortions appearing in a color carrier signal reproduced by a recording device and including a color synchronizing signal whose relative phase is varied by a predetermined amount between each successive pair of picture lines defined by such carrier signal, which circuit comprise, in combination:

(a) electronically controllable time delay means connected to conduct such color carrier signal and having a control input for receiving a signal whose value determines the amount of time delay imparted to such color carrier signal;

(b) means producing a constant phase reference carrier signal having the same frequency as such color synchronizing signal;

(c) phase comparator means having a first input connected to receive such reference signal, a second input connected to receive such synchronizing signal, and an output connected to said delay line control input; and (d) phase shifting means connected in series with one of said comparator means inputs for shifting the phase of the signal applied thereto at a rate equal to the picture line scanning rate defined by such color carrier signal and by an amount equal to said predetermined amount by which such synchronizing signal is varied.

2. An arrangement as defined in claim 1 wherein said phase shifting means comprises control means connected to receive pulses derived from such color synchronizing signal for synchronizing the phase shifting rate to the picture scanning rate.

3. An arrangement as defined in claim 1 wherein said phase shifting means produces a phase shift of 90°.

4. An arrangement as defined in claim 1 wherein said phase shifting means comprises: an electronic video switch having an output connected to said one comparator means input, a first input connected for directly conducting the signal to be applied to said one comparator means input, and a second input; a phase shifting member connected in series with said second switch input for conducting the signal to be received by said one comparator means input; and switch control means for individually connecting each of said switch means input in sequence to said switch means output at a rate equal to the picture line scanning rate defined by such color carrier signal.

5. An arrangement as defined in claim 1 wherein said phase shifting means comprises: an electronic switch having an output connected to said one comparator means input, and a pair of inputs; a first phase shifter connected in series to one of said switching means inputs for conducting the signal to be applied to said one comparator means input; a second phase shifter connected in series with the other of said switching means input for conducting the signal to be applied to said one comparator means input, said second phase shifter producing a phase shift which differs from that produced by said first phase shifter by the predetermined amount by which the phase of such color synchronizing signal is varied; and switch control means for individually connecting each of said switching means inputs to said switching means output in sequence at a rate equal to the picture line scanning rate defined by such color carrier signal.

6. An arrangement as defined in claim 5 wherein said first phase shifter produces a negative phase shift and said second phase shifter produces a positive phase shift.

7. An arrangemment as defined in claim 6 wherein said first phase shifter produces a phase shift of −45° with respect to a reference phase angle and said second phase shifter produces a phase shift of +45° with respect to the same reference phase angle.

References Cited

UNITED STATES PATENTS 3,141,926 7/1964 Newell ------------- 178—5.4

FOREIGN PATENTS 1,005,290 9/1965 Great Britain.

RICHARD MURRAY, Primary Examiner

JOHN MARTIN, Assistant Examiner